P. V. HUNTER AND J. R. BEARD.
PROTECTIVE ARRANGEMENT FOR ELECTRIC DISTRIBUTION SYSTEMS.
APPLICATION FILED MAR. 1, 1919.
1,389,306.   Patented Aug. 30, 1921.
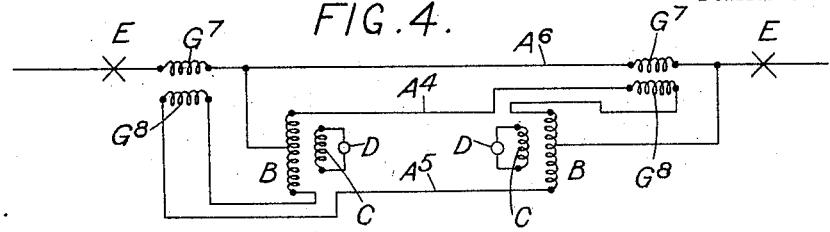
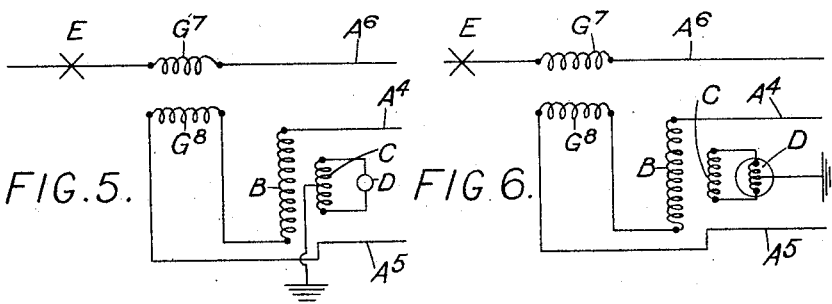
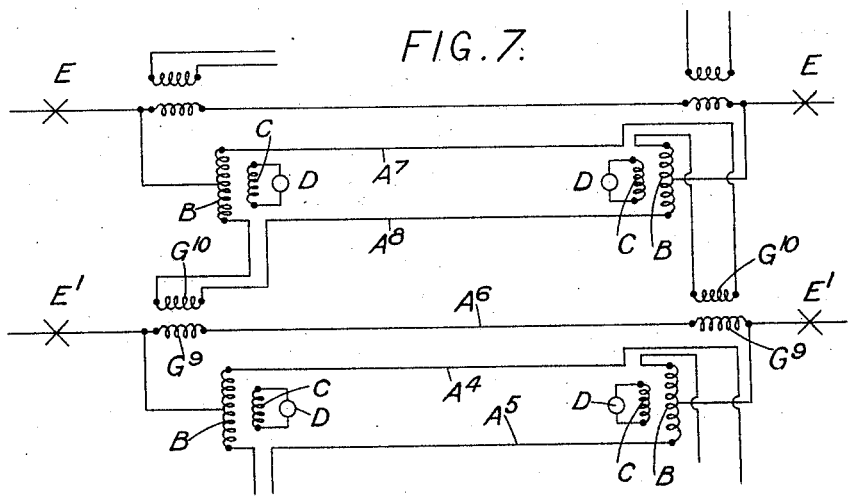
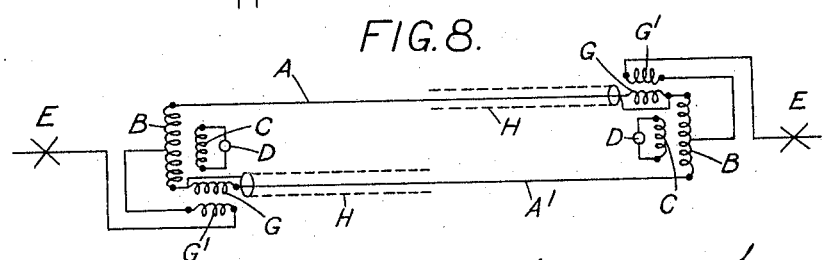
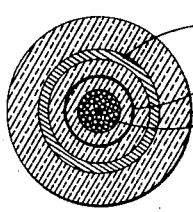

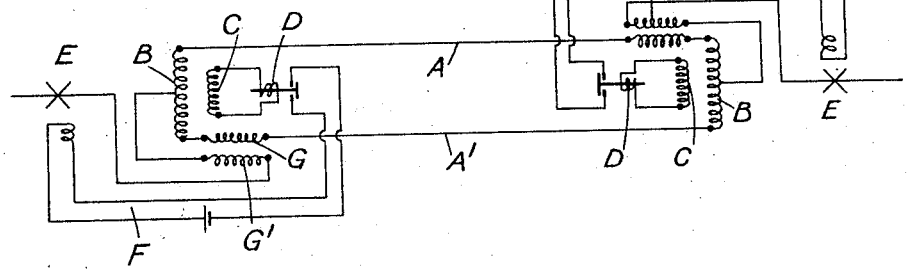
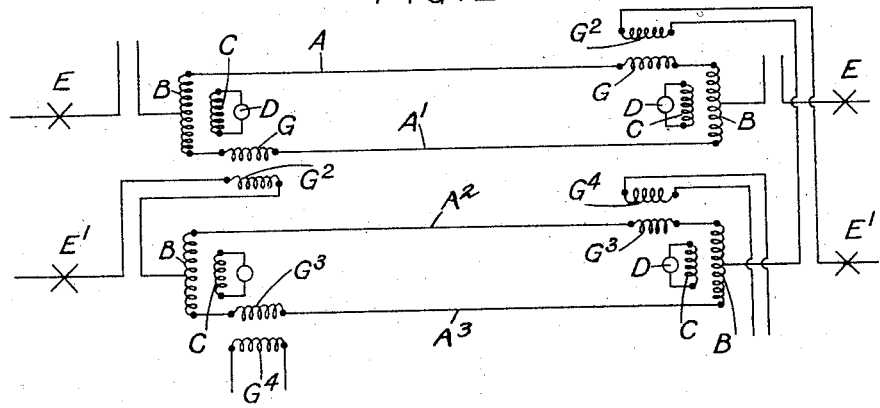
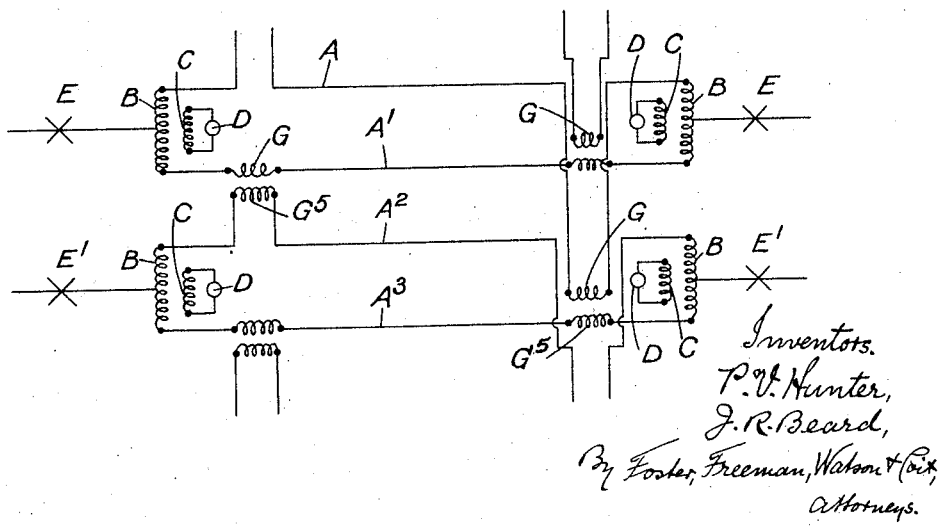

UNITED STATES PATENT OFFICE.

PHILIP VASSAR HUNTER, OF PURLEY, AND JAMES ROBERT BEARD, OF BENTON, ENGLAND, ASSIGNORS TO ELECTRICAL IMPROVEMENTS LIMITED, OF NEWCASTLE-UPON-TYNE, ENGLAND, A COMPANY OF GREAT BRITAIN.

PROTECTIVE ARRANGEMENT FOR ELECTRIC DISTRIBUTION SYSTEMS.

1,389,306.  Specification of Letters Patent.  Patented Aug. 30, 1921.

Application filed March 1, 1919. Serial No. 280,054.

*To all whom it may concern:*

Be it known that we, PHILIP VASSAR HUNTER and JAMES ROBERT BEARD, subjects of the King of England, and residing, respectively, at Purley, Surrey, in England, and Benton, county of Northumberland, in England, have invented certain new and useful Improvements in Protective Arrangements for Electric Distribution Systems, of which the following is a specification.

This invention relates to protective arrangements for electric distribution systems and has particular reference to what are generally known as split conductor systems in which the conductors are split or divided into pairs, each member of the pair normally carrying the same current.

Various automatic arrangements have been proposed for the protection of such split conductor systems by automatically cutting out the paired or parallel members on a fault occurring. Such arrangements have comprised balancing transformers, relays, circuit breakers and the like arranged so that the unbalancing effect due to a fault has caused the circuit breaker at each end of the split conductors to operate thus cutting out the particular pairs entirely.

Such protective arrangements sometimes have the disadvantage that their sensitiveness depends upon the position of the fault relatively to the ends of the split conductors, and various modifications have been proposed to obviate this disadvantage and increase the sensitiveness of the protective system whatever may be the position of the fault.

This is also the object of the present invention and it is attained by employing in combination with balancing transformers arranged in well known ways current transformers coöperating with the balancing transformers, the arrangement being such that until a fault occurs the action of the current transformers is balanced, but when a fault occurs an unbalancing effect is produced proportionate to the fault current only and independent of the position of the fault relative to the ends of the split conductors.

The arrangement of the current transformers is such that the main current or a current proportional thereto tends to disturb the balance between the currents in the split conductors, this disturbing tendency being equal and opposite at each end so that so long as the protected section is sound no actual disturbance of the balance takes place. If, however, a fault occurs a difference is at once produced between the values of the current at the two ends and consequently between the opposing disturbing tendencies, and thus a disturbance results in the balance of the protective arrangement at each end and the switches or circuit breakers are operated.

The primaries of the current transformers may be in series with the main switches, the secondary windings being in series with the respective members of each split conductor, but in multiphase systems the primary winding need not be connected to the same conductor as that with which the secondary winding is in circuit but may be connected to an adjacent conductor in the same feeder, this arrangement having the advantage that the relays of two phases will operate for faults on one phase-conductor only.

Again the current transformer whose secondary winding is in circuit with one member of the split conductor of one phase may have its primary winding in circuit with one member of the split conductor of an adjacent phase.

The invention may be applied to split conductor systems in which the split conductors comprise a portion of the feeder only and form what may be termed balancing strands connected to the main core of the feeder, and in such cases provision may be made for the discharge to earth of capacity current flowing to the secondary winding of the current transformer so that such capacity current does not affect the relay.

Further, in order that the capacity currents produced by the opposed potentials of the secondary windings of the current transformers may not affect the balancing transformers shielding sheaths may be provided for the members of the split conductors.

In the accompanying drawings which illustrate diagrammatically various protective arrangements according to this invention:

Figure 1 shows the simplest application of the invention to one split conductor only;

Fig. 2 illustrates an arrangement in which the primary of a current transformer in series with the main switch of one phase coöperates with a secondary winding in an adjacent phase;

Fig. 3 shows an arrangement similar to Fig. 2, but the primary winding of the current transformer is connected in series with one member of the split conductor in the same phase instead of being in series with the main switch;

Fig. 4 shows the invention applied to a feeder which consists of a single conductor in parallel with a split conductor;

Figs. 5 and 6 show two arrangements in which provision is made for the discharge to earth of capacity current;

Fig. 7 illustrates a system similar to that shown in Fig. 4, but having the secondary transformers arranged so that the primary winding of one phase coöperates with the secondary winding in an adjacent phase.

Fig. 8 is a diagram similar to Fig. 1, but showing the members of a split conductor provided with a capacity current shielding sheath, and Fig. 9 is a diagrammatic cross section showing the two members of a split conductor and the shielding sheath.

With reference first to Fig. 1 the split conductor A A' is connected at each end through a balancing transformer B the secondary winding C of this balancing transformer operating a relay D which controls the switch or circuit breaker E through a local circuit F. At one end of the feeder formed by the split conductor A A' the secondary coil G of a current transformer is inserted in series with the member A' and the primary winding G' of this current transformer is in series with the main switch or circuit breaker E. A similar current transformer is provided at the other end of the feeder its secondary coil being in series with the member A.

During normal operation, that is to say while the feeder is sound, the disturbing effects of the two current transformers are equal and opposite, but in the event of a fault occurring at any portion of the feeder between the current transformers they produce unbalanced conditions at the ends of the feeder and cause the simultaneous opening of the circuit breakers E. Such operation of the circuit breakers would tend to occur through the action of the balancing transformers B alone, but in that case the sensitiveness of the arrangement would depend on the position of the fault relative to the ends of the feeder and the action of the current transformers may be regarded as producing a further unbalancing effect when a fault occurs, such unbalancing effect being independent of the position of the fault. Another advantage of the arrangement is that as the circuit breakers will operate on the occurrence of a fault anywhere between the primary windings G' of the current transformers they will necessarily operate in the event of a leakage fault in the windings of the balancing transformers.

The arrangement shown in Fig. 2 is similar to that illustrated in Fig. 1, except that connections for two adjacent phases are shown formed of the split conductors A A' and A² A³ respectively, the primary winding G² of the current transformer at each end of the conductor A A' being in series with the main switch or circuit breaker E' in the same phase with the split conductor A² A³. The secondary windings G³ of the current transformers in the split conductor A² A³ work in conjunction with primary windings G⁴ in circuit with the conductor in next adjacent phase which is not shown in the diagram.

In Fig. 2 and in the remaining figures the local circuit controlling the circuit breaker is omitted, the secondary winding C of the balancing transformer B merely being shown as connected to a relay D. It will be understood that any suitable and usual devices may be employed for the actual operation of the circuit breakers.

The arrangement shown in Fig. 3 is similar to that described with reference to Fig. 2, the only difference being that the primary windings G⁵ of the current transformers in circuit with the split conductor A² A³ are joined in series with each member of the split conductor respectively instead of being in series with the main switch controlling both the members. As in Fig. 2 the primary windings G⁵ of the one phase act in conjunction with the secondary windings G of the adjacent phase.

Fig. 4 illustrates the application of the present invention to a protective system of the kind in which the split conductor A⁴ A⁵ forms a part only of the feeder which comprises a main conductor A⁶ and the two split conductor members A⁴ A⁵ which may be termed balancing strands. Apart from this difference the arrangement shown in Fig. 4 is similar to that described with reference to Fig. 2 the primary windings G⁷ of the current transformers coöperating with secondary windings G⁸ in series with the split conductor members A⁴ and A⁵ respectively. The current transformers act in the same manner as has been described with reference to Fig. 1.

It will be noticed that in Fig. 4 the midpoint of the primary winding B of the balancing transformer is connected to the main conductor A⁶ of the feeder. This is not essential, but if this connection is not made it may be necessary to provide a path for the discharge to earth of capacity current flowing to the secondary winding of the current transformer in order that such capacity current may not affect the relay D. One arrangement for accomplishing this is shown in Fig. 5 where the midpoint of the secondary winding C of the balancing transformer is shown as connected to earth.

Fig. 6 shows an alternative method of providing for the discharge of capacity current by connecting the mid-point of the relay winding D to earth.

The arrangement illustrated in Fig. 7 is somewhat similar to that described with reference to Fig. 2 and shows how the protective arrangement illustrated in Fig. 4 may be modified so that the primary windings $G^9$ of the current transformers connected in series with the main conductor of one phase may coöperate with secondary windings $G^{10}$ in circuit with the split conductor $A^7 A^8$ of an adjacent phase.

In the arrangements described with reference to Figs. 1 to 7 the opposed potentials of the secondary windings of the current transformers tend to produce capacity currents between the members of the split conductor. These capacity currents circulate through the windings of the balancing transformers and are liable, if the load carried by the feeder is sufficiently large, to cause the circuit breakers to operate although there may be no fault in the feeder. This difficulty may be overcome by the use of capacity current shielding sheaths acting in the manner described in the specification of the present applicants' pending U. S. A. patent application, Serial No. 232,984 filed May 6th, 1918, so that all such capacity current is diverted from the windings of the balancing transformers.

Fig. 8 shows by way of example how this may be done in a protective arrangement like that shown in Fig. 1 a capacity current shielding sheath H being interposed between the members A and A' of the split conductor.

In practice the split conductor A A' would preferably be made up of concentric conductors in a cable and the shield H would be in the form of a light metallic conductor also concentric and placed between the members A A' in the manner indicated in Fig. 9.

As described in the prior specification Ser. No. 232984 above mentioned, the capacity shield H should be severed or open-circuited somewhere along its length.

It is obvious that capacity shielding sheaths may be applied to the arrangements shown in Figs. 2 to 7 in a manner similar to that described with reference to Fig. 8.

In the foregoing description the details of the balancing transformers are not described as their use in protective arrangements is well known.

What we claim as our invention and desire to secure by Letters Patent is:

1. In a protective arrangement for split conductor systems of electric distribution the combination with the split or parallel conductors, of a balancing transformer at each end of the split conductors which are connected through the primary winding of such transformers, and means consisting of a current transformer coöperating with each balancing transformer, whereby until a fault occurs the action of the current transformers is balanced, but when a fault occurs an unbalancing effect is produced proportionate to the fault current and independent of the position of the fault relative to the ends of the split conductors.

2. In a protective arrangement for split conductor systems of electric distribution the combination with the split or parallel conductors, of a balancing transformer at each end of the split conductors, switches controlling the split conductors and current transformers having their secondary windings in series with the respective split conductors and their primary windings in series with the switches controlling the split conductors the arrangement being such that until a fault occurs the action of the two current transformers is balanced but when a fault occurs an unbalancing effect is produced proportionate to the fault current and independent of the position of the fault relative to the ends of the split conductors.

3. In a protective arrangement for split conductor systems of electric distribution the combination with the split or parallel conductors, of a balancing transformer at each end of the split conductors, switches controlling the split conductors, current transformers having their secondary windings in series with the respective split conductors and their primary windings in series with the switches controlling the split conductors and capacity current shielding sheaths interposed between the split conductors so that capacity current produced by the opposed potentials of the secondary windings of the current transformers are prevented from affecting the balancing transformers.

4. In a protective arrangement for split conductor systems of electric distribution the combination of split or parallel conductors, a balancing transformer at each end of said conductors which are connected through the primary winding of said transformer, a current transformer at one end of one split conductor having its primary winding in series therewith, another current transformer at the other end of the other split conductor its primary winding being in series therewith, switches controlling each end of the pair of split conductors each of such switches being in series with the primary winding of the current transformer at the adjacent end of the split conductors and circuit breaking means controlled by the secondary windings of the balancing transformers and operating upon the switches substantially as and for the purpose set forth.

5. In a protective arrangement for split conductor systems of electric distribution the combination of split or parallel conductors, a balancing transformer at each end of said conductors which are connected through the primary winding of said transformer, a current transformer at one end of one split conductor having its primary winding in series therewith, another current transformer at the other end of the other split conductor its primary winding being in series therewith, switches controlling each end of the pair of split conductors, each of such switches being in series with the primary winding of the current transformer at the adjacent end of the split conductors, capacity current shielding sheaths interposed between the split conductors, and circuit breaking means controlled by the secondary windings of the balancing transformers and operating upon the switches substantially as and for the purpose set forth.

In testimony whereof we have signed our names to this specification in the presence of two subscribing witnesses.

PHILIP VASSAR HUNTER.
JAMES ROBERT BEARD.

Witnesses to the signature of Philip Vassar Hunter:
ARTHUR JAMES HALL,
R. BAGGOTT.

Witnesses to the signature of James Robert Beard:
L. H. BOOTH,
J. E. PIGDON.